(12) United States Patent
Jiang et al.

(10) Patent No.: US 11,368,194 B2
(45) Date of Patent: Jun. 21, 2022

(54) OMNIDIRECTIONAL BEAMFORMING METHOD

(71) Applicant: FUDAN UNIVERSITY, Shanghai (CN)

(72) Inventors: Yi Jiang, Shanghai (CN); Fengjie Li, Shanghai (CN); Cheng Du, Shanghai (CN); Xin Wang, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 0 days.

(21) Appl. No.: 17/317,830

(22) Filed: May 11, 2021

(65) Prior Publication Data

US 2021/0266044 A1  Aug. 26, 2021

(30) Foreign Application Priority Data

Jan. 21, 2021 (CN) .......................... 202110078245.6

(51) Int. Cl.
*H04B 7/04* (2017.01)
*H04B 7/0426* (2017.01)
*H04B 7/0452* (2017.01)
*H04L 5/00* (2006.01)

(52) U.S. Cl.
CPC .......... *H04B 7/0447* (2013.01); *H04B 7/043* (2013.01); *H04B 7/0452* (2013.01); *H04L 5/0016* (2013.01)

(58) Field of Classification Search
CPC .... H04B 7/0447; H04B 7/043; H04B 7/0452; H04L 5/0016

USPC ........................................................ 375/262
See application file for complete search history.

(56) References Cited

U.S. PATENT DOCUMENTS

| | | | |
|---|---|---|---|
| 2015/0092621 A1* | 4/2015 | Jalloul | H04L 5/1461 370/278 |
| 2015/0263424 A1* | 9/2015 | Sanford | H01Q 13/206 342/371 |
| 2016/0233899 A1* | 8/2016 | Thomas | H04W 72/12 |
| 2018/0226840 A1* | 8/2018 | Leabman | H02J 50/20 |

FOREIGN PATENT DOCUMENTS

| | | |
|---|---|---|
| CN | 1392692 A | 1/2003 |
| CN | 102571181 A | 7/2012 |

OTHER PUBLICATIONS

Li et al "Construction of Golay Complementary Matrices and its Applications to MIMO Omnidirectional Transmission". IEEE Transaction on Signal Processing (vol. 69). Mar. 22, 2021. pp. 2100-2113. (Year: 2021).*

Jiang et al "Autocorrelation Complementary Matrices" 2019 53rd Asilomar COnference on Signals, Systems, and Computers. Nov. 3-6, 2019, Pacific Grove, CA. (Year: 2019).*

(Continued)

*Primary Examiner* — Kevin M Burd

(57) ABSTRACT

The present disclosure provides an omnidirectional beamforming method. In the omnidirectional beamforming method, a space-time block coding is performed on a data stream to be sent to obtain the coded data stream. Omnidirectional beamforming matrices corresponding to a uniform rectangular antenna array are constructed. The beamforming is performed on the coded data stream through the omnidirectional beamforming matrices, to generate a signal to be sent of the uniform rectangular antenna array.

3 Claims, 10 Drawing Sheets

(56) References Cited

OTHER PUBLICATIONS

Su et al. "Omnidirectional Transmit Beamforming for Massive MIMO with Uniform Rectangualr Array" 2018 IEEE Internation Conference on Communication (ICC). May 20-24, 2018. Kansas City, MO. (Year: 2018).*

* cited by examiner

OMNIDIRECTIONAL BEAMFORMING METHOD

CROSS-REFERENCE TO RELATED APPLICATIONS

This application claims the benefit of priority from Chinese Patent Application No. 202110078245.6, filed on Jan. 21, 2021. The content of the aforementioned application, including any intervening amendments thereto, is incorporated herein by reference in its entirety.

TECHNICAL FIELD

The present application relates to communication technologies, and more particularly to an omnidirectional beamforming method.

BACKGROUND

Massive MIMO (multiple-input multiple-output) plays a key role in realizing the commercialization of the fifth generation technology (5G). In order to realize the commercialization of the massive MIMO, it is preferable to arrange the antennas in a uniform rectangular array. For base stations deployed with a uniform rectangular antenna array, how to realize the omnidirectional transmission of common signals is a key factor to improve the overall network performance. Therefore, it is urgent to solve the problem that how the base station realizes the omnidirectional transmission of common signals under the uniform rectangular antenna array.

SUMMARY

An object of the present disclosure is to provide an omnidirectional beamforming method, to solve the technical problem in the prior art that the base station cannot realize the omnidirectional transmission of common signals under a uniform rectangular antenna array.

The technical solutions of the present disclosure are described as follows.

In a first aspect, the present disclosure provides an omnidirectional beamforming method, comprising:

performing a space-time block coding on a data stream to be sent, to obtain a coded data stream;

constructing omnidirectional beamforming matrices corresponding to a uniform rectangular antenna array through a pair of Golay complementary matrices or four autocorrelation complementary matrices;

wherein the uniform rectangular antenna array consists of $L \times M$ antennas; L is the number of rows of the uniform rectangular antenna array; M is the number of columns of the uniform rectangular antenna array; an array response vector of the uniform rectangular antenna array at a spatial angle of $(\varphi, \theta)$ is calculated as follows:

$$[A(\varphi, \theta)]_{lm} = e^{-j\frac{2\pi}{\lambda}(l-1)d_y \sin\varphi\sin\theta - j\frac{2\pi}{\lambda}(m-1)d_x \sin\varphi\cos\theta},$$

for $l = 1, 2, \ldots, L; m = 1, 2, \ldots, M;$ $\theta \in [0, 2\pi]; \varphi \in [0, \pi];$ wherein $[A(\varphi, \theta)]_{lm}$ represents the array response vector of the uniform rectangular antenna array; the array response vector is a response capability of the antennas in the uniform rectangular antenna array to an incoming wave in a certain direction; a spatial rectangular coordinate system is established, wherein a coordinate origin is a point of a plane where the uniform rectangular antenna array is located; the plane where the uniform rectangular antenna array is located is a xoy plane; and a z-axis is a normal vector of the plane where the uniform rectangular antenna array is located; $\varphi$ represents an angle between a transmission direction of a signal to be sent and the z-axis in the spatial rectangular coordinate system; $\theta$ represents an angle between a projection of the transmission direction of the signal to be sent on the xoy plane and an x-axis in the spatial rectangular coordinate system; $\lambda$ represents a wavelength of the signal to be sent; $d_x$ represents a distance between two adjacent antennas in the uniform rectangular antenna array in a direction of the x-axis; and $d_y$ represents a distance between two adjacent antennas in the uniform rectangular antenna array in a direction of a y-axis;

assuming that an omnidirectional beamforming matrix set formed by performing beamforming on the uniform rectangular antenna array is $\{W_n\}_{n=1}^N$; wherein $W_n \in \mathbb{C}^{L \times M}$; an autocorrelation of the $\{W_n\}_{n=1}^N$ is calculated as follows:

$$R_{W_n}(\varsigma, \tau) = \sum_{l=1}^{L} \sum_{m=1}^{M} W_n(l, m) W_n^*(l + \varsigma, m + \tau),$$

$-L + 1 \leq \varsigma \leq L - 1, -M + 1 \leq \tau \leq M - 1;$ wherein $\varsigma$ represents a translation in the direction of the y-axis; $\tau$ represents a translation in the direction of the x-axis; and $(\bullet)^*$ represents a conjugation;

the omnidirectional beamforming matrix set $\{W_n\}_{n=1}^N$ satisfies the following equation:

$\sum_{n=1}^{N} R_{W_n}(\varsigma, \tau) = LMN \cdot \delta(\varsigma)\delta(\tau);$ wherein the omnidirectional beamforming matrix set $\{W_n\}_{n=1}^N$ is autocorrelation complementary matrices (L,M,N)-ACM; $\delta(\varsigma)$ and $\delta(\tau)$ are both a Kronecker delta functions $$\delta(\varsigma) = \begin{cases} 1 & \varsigma = 0 \\ 0 & \varsigma \neq 0 \end{cases};$$

when N=2, (L,M,N)-ACM is a pair of Golay complementary matrices; and performing beamforming on the coded data stream through the omnidirectional beamforming matrices, to generate the signal to be sent of the uniform rectangular antenna array.

In an embodiment, the omnidirectional beamforming matrices are shown as follows:

$$W_1 = \begin{pmatrix} ac^T \\ bd^T \end{pmatrix}, W_2 = \begin{pmatrix} -a\tilde{d}^T \\ b\tilde{c}^T \end{pmatrix} \in \mathbb{C}^{L \times M};$$

wherein half of the number of the rows L/2 and the number of the columns M of the uniform rectangular antenna array are both complex Golay numbers; $W_1$ and $W_2$ are a pair of Golay complementary matrices; a sequence a and a sequence b are a pair of Golay complementary sequences with a length of L/2; and a sequence c and a sequence d are a pair of Golay complementary sequences with a length of M.

In an embodiment, the omnidirectional beamforming matrices are shown as follows:

$$W_1 = (ca^T, db^T), W_2 = (-\tilde{d}a^T, \tilde{c}b^T) \in \mathbb{C}^{L \times M};$$

wherein the number of the rows L and half of the number of the columns M/2 of the uniform rectangular antenna array are both complex Golay numbers; $W_1$ and $W_2$ are a pair of Golay complementary matrices; a sequence a and a sequence b are a pair of Golay complementary sequences with a length of M/2; a sequence c and a sequence d are a pair of Golay complementary sequences with a length of L; and (˜•) represents conjugation and flip.

In an embodiment, the omnidirectional beamforming matrices are shown as follows:

$$W_1 = ac^T, W_2 = ad^T, W_3 = bc^T, W_4 = bd^T \in \mathbb{C}^{L \times M};$$

wherein the number of the rows L and the number of the columns M of the uniform rectangular antenna array are both complex Golay numbers; $W_1$, $W_2$, $W_3$ and $W_4$ are four autocorrelation complementary matrices; a sequence a and a sequence b are a pair of Golay complementary sequences with a length of L; and a sequence c and a sequence d are a pair of Golay complementary sequences with a length of M.

In an embodiment, the signal to be sent is shown as follows:

$$X(t) \triangleq \Sigma_{n=1}^{N} W_n s_n(t) \in \mathbb{C}^{L \times M};$$

wherein X(t) is the signal to be sent; an integer t is an index of a time domain; $W_n \in \mathbb{C}^{L \times M}$ represents a spatial beamforming weight of $s_n(t)$; wherein n=1, . . . , N, and N is a positive integer.

In a second aspect, the present disclosure further provides another omnidirectional beamforming method, comprising:

constructing a first beamforming matrix corresponding to a first polarized antenna sub-array; performing a beamforming on a data stream to be sent through the first beamforming matrix, to obtain a first polarized signal; and sending the first polarized signal via the first polarized antenna sub-array; and constructing a second beamforming matrix corresponding to a second polarized antenna sub-array; performing a beamforming on the data stream to be sent through the second beamforming matrix, to obtain a second polarized signal; and sending the second polarized signal via the second polarized antenna sub-array;

wherein the first polarized antenna sub-array and the second polarized antenna sub-array are in an orthogonal relationship.

In an embodiment, the first polarized antenna sub-array is a left-polarized antenna sub-array; the first beamforming matrix is a left-polarized beamforming matrix; the second polarized antenna sub-array is a right-polarized antenna sub-array; and the second beamforming matrix is a right-polarized beamforming matrix; or the first polarized antenna sub-array is a horizontally polarized antenna sub-array; the first beamforming matrix is a horizontally polarized beamforming matrix; the second polarized antenna sub-array is a vertically polarized antenna sub-array; and the second beamforming matrix is a vertically polarized beamforming matrix.

In an embodiment, the left-polarized beamforming matrix corresponding to the left-polarized antenna sub-array and the right-polarized beamforming matrix corresponding to the right-polarized antenna sub-array are constructed through a pair of Golay complementary matrices; wherein the first beamforming matrix is a left-polarized beamforming matrix, and the second beamforming matrix is a right-polarized beamforming matrix.

In an embodiment, the left-polarized beamforming matrix and the right-polarized beamforming matrix are shown as follows:

$$W_{left} = \begin{pmatrix} ac^T \\ bd^T \end{pmatrix}, W_{right} = \begin{pmatrix} -a\tilde{d}^T \\ b\tilde{c}^T \end{pmatrix} \in \mathbb{C}^{\frac{L}{2} \times M};$$

wherein $W_{left}$ is the left-polarized beamforming matrix; $W_{right}$ is the right-polarized beamforming matrix; half of the number of rows L/4 and the number of the columns M of the left-polarized antenna sub-array and half of the number of rows L/4 and the number of columns M of the right-polarized antenna sub-array are both complex Golay numbers; $W_{left}$ and $W_{right}$ are a pair of Golay complementary matrices; a sequence a and a sequence b are a pair of Golay complementary sequences with a length of L/4; a sequence c and a sequence d are a pair of Golay complementary sequences with a length of M; and (˜•) represents conjugation and flip.

In an embodiment, the left-polarized beamforming matrix and the right-polarized beamforming matrix are as follows:

$$W_{left} = \begin{pmatrix} ac^T \\ bd^T \end{pmatrix}, W_{right} = \begin{pmatrix} -a\tilde{d}^T \\ b\tilde{c}^T \end{pmatrix} \in \mathbb{C}^{L \times \frac{M}{2}};$$

wherein $W_{left}$ is the left-polarized beamforming matrix; $W_{right}$ is the right-polarized beamforming matrix; half of the number of rows L/2 and the number of columns M/2 of the left-polarized antenna sub-array and the right-polarized antenna sub-array are both complex Golay numbers; $W_{left}$ and $W_{right}$ are a pair of Golay complementary matrices; a sequence a and a sequence b are a pair of Golay complementary sequences with a length of L/2; a sequence c and a sequence d are a pair of Golay complementary sequences with a length of M/2; and (˜•) represents conjugation and flip.

In an embodiment, the left-polarized beamforming matrix and the right-polarized beamforming matrix are as follows:

$$W_{left} = (ca^T, db^T), W_{right} = (-\tilde{d}a^T, \tilde{c}b^T) \in \mathbb{C}^{\frac{L}{2} \times M};$$

wherein $W_{left}$ is the left-polarized beamforming matrix; $W_{right}$ is the right-polarized beamforming matrix; the number of rows L/2 and half of the number of columns M/2 of the left-polarized antenna sub-array and the number of rows L/2 and half of the number of columns M/2 of the right-polarized antenna sub-array are both complex Golay numbers; $W_{left}$ and $W_{right}$ are a pair of Golay complementary matrices; a sequence a and a sequence b are a pair of Golay complementary sequences with a length of M/2; a sequence c and a sequence d are a pair of Golay complementary sequences with a length of L/2; and (˜•) represents conjugation and flip.

In an embodiment, the left-polarized beamforming matrix and the right-polarized beamforming matrix are shown as follows:

$$W_{left} = (ca^T, db^T), W_{right} = (-\tilde{d}a^T, \tilde{c}b^T) \in \mathbb{C}^{L \times \frac{M}{2}};$$

wherein $W_{left}$ is the left-polarized beamforming matrix; $W_{right}$ is the right-polarized beamforming matrix; the number of rows L and half of the number of columns M/4 of the left-polarized antenna sub-array and the number of rows L and half of the number of columns M/4 of the right-polarized antenna sub-array are both complex Golay numbers; $W_{left}$ and $W_{right}$ are a pair of Golay complementary matrices; a sequence a and a sequence b are a pair of Golay complementary sequences with a length of M/4; a sequence c and a sequence d are a pair of Golay complementary sequences with a length of L; and (•) represents conjugation and flip.

Compared to the prior art, the present invention has the following beneficial effects.

In the omnidirectional beamforming method of the present disclosure, the coded data stream is obtained by performing a space-time block coding on the data stream to be sent; the omnidirectional beamforming matrices corresponding to the uniform rectangular antenna array are constructed; and the beamforming is performed on the coded data stream through the omnidirectional beamforming matrices, to generate a signal to be sent of the uniform rectangular antenna array. Through the arrangement in the present disclosure, the omnidirectional transmission of common signals can be realized, so that the signals to be sent have the same signal energy distribution in space, that is, the signals to be sent at any point in the space has the same energy, thereby improving the performance of the overall network.

BRIEF DESCRIPTION OF THE DRAWINGS

In order to explain the embodiments of the present disclosure or the technical solutions in the prior art more clearly, the following will briefly introduce the drawings that need to be adopted in the description of the embodiments or the prior art. Obviously, the drawings in the following description are only represents some embodiments of the present disclosure. For those of ordinary skill in the art, without creative work, other drawings can be obtained based on the structure shown in these drawings.

DETAILED DESCRIPTION OF EMBODIMENTS

The technical solutions in the embodiments of the present disclosure will be clearly and completely described below in conjunction with the accompanying drawings in the embodiments of the present disclosure. Obviously, the described embodiments are only a part of embodiments of the present disclosure, rather than all the embodiments. Based on the embodiments of the present disclosure, all other embodiments obtained by those of ordinary skill in the art without creative work shall fall within the protection scope of the present disclosure.

It should be noted that all directional indications (such as up, down, left, right, front, back) in the embodiments of the present disclosure are only used to explain the relative positional relationship and movement of the components in a specific posture (as shown in the accompanying drawings). If the specific posture changes, the directional indication changes accordingly.

In addition, the descriptions related to "first" and "second" in the present disclosure are only used for descriptive purposes, and cannot be understood as indicating or implying their relative importance or implicitly indicating the number of indicated technical features. Therefore, the features defined with "first" and "second" may explicitly or implicitly include at least one of the features. In addition, the "and/or" in the full text includes three solutions. Taking "A and/or B" as an example, it includes the A technical solution, the B technical solution, and the A and B technical solution. Moreover, the technical solutions among the various embodiments can be combined with each other, but it must be based on what can be achieved by those of ordinary skill in the art. When the combination of technical solutions is contradictory or cannot be achieved, it should be considered that the combination of such technical solutions does not exist, nor is it required by the present disclosure, and they are not within the protection scope of the present disclosure.

Figure 1:
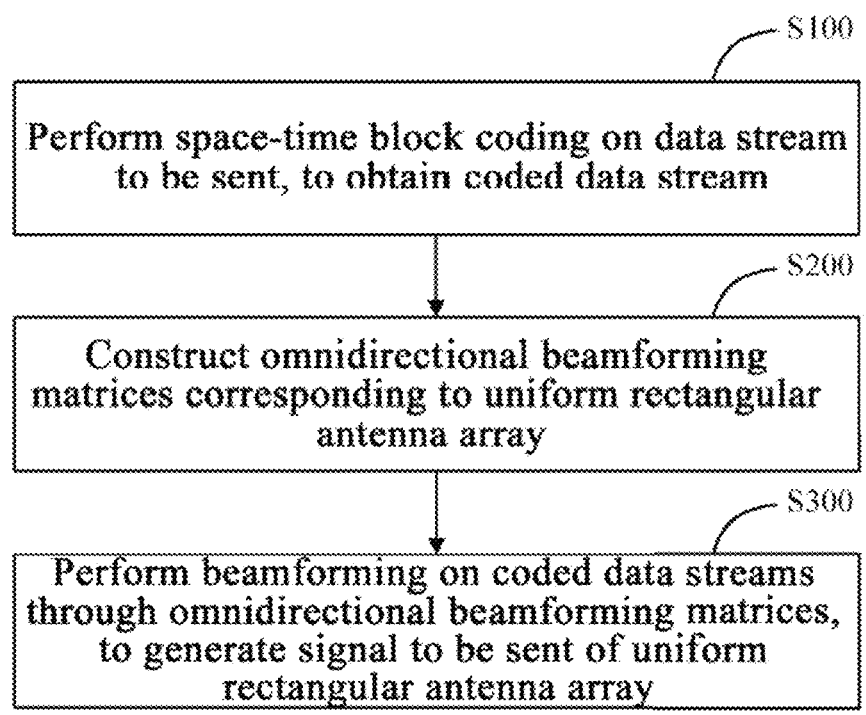
FIG. 1 is a flowchart of an omnidirectional beamforming method according to an embodiment of the present disclosure.

As shown in FIG. 1, in one embodiment, provided is an omnidirectional beamforming method, which is applied to a base station. The omnidirectional beamforming method specifically includes the following steps.

S100) A space-time block coding is performed on a data stream to be sent, to obtain a coded data stream.

Specifically, after performing space-time block coding on the data stream by the base station, the obtained coded data stream is $[s_1(t), s_2(t), \ldots, s_n(t)]^T$, where $s_n(t)$ is an element in a position (n,t) of $s_n(t)$; t is a time index; and $(\bullet)^T$ is a transposition operation.

S200) Omnidirectional beamforming matrices corresponding to a uniform rectangular antenna array is constructed.

Figure 2:
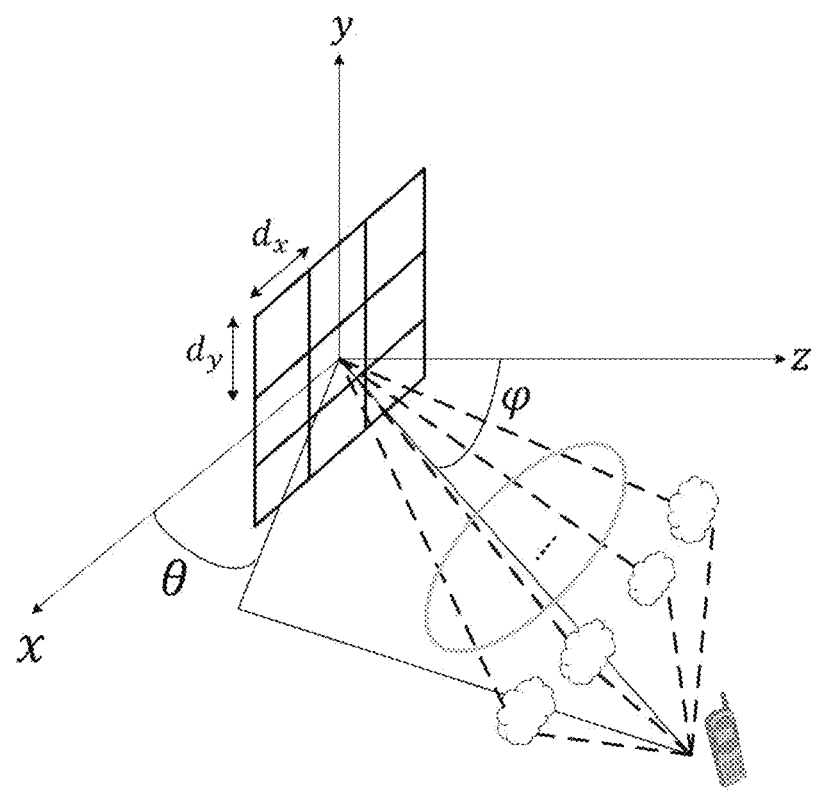
FIG. 2 is a schematic diagram of a uniform rectangular antenna array according to an embodiment of the present disclosure.

In an embodiment, the uniform rectangular antenna array consists of L×M antennas. L is the number of rows of the uniform rectangular antenna array. M is the number of columns of the uniform rectangular antenna array. An array response vector of the uniform rectangular antenna array at a spatial angle of (φ,θ) is calculated as follows:

$$[A(\varphi, \theta)]_{lm} = e^{-j\frac{2\pi}{\lambda}(l-1)d_y \sin\varphi\sin\theta - j\frac{2\pi}{\lambda}(m-1)d_x \sin\varphi\cos\theta}, \quad (1)$$

for $l = 1, 2, \ldots, L; m = 1, 2, \ldots, M;$ $\theta \in [0, 2\pi]; \varphi \in [0, \pi];$ where $[A(\varphi,\theta)]_{lm}$ represents the array response vector of the uniform rectangular antenna array. The array response vector is a response capability of the antennas in the uniform rectangular antenna array to an incoming wave in a certain direction. As shown in FIG. 2, a spatial rectangular coordinate system is established, wherein a coordinate origin is a point of a plane where the uniform rectangular antenna array is located; the plane where the uniform rectangular antenna array is located is a xoy plane; and a z-axis is a normal vector of the plane where the uniform rectangular antenna array is located. φ represents an angle between a transmission direction of the signal to be sent and the z-axis in the spatial rectangular coordinate system. θ represents an angle between a projection of the transmission direction of the signal to be sent on the xoy plane and an x-axis in the spatial rectangular coordinate system. λ represents a wavelength of the signal to be sent. $d_x$ represents a distance between two adjacent antennas in the uniform rectangular antenna array in a direction of the x-axis. $d_y$ represents a distance between two adjacent antennas in the uniform rectangular antenna array in a direction of a y-axis.

It is assumed that an omnidirectional beamforming matrix set formed by performing beamforming on the uniform rectangular antenna array is $\{W_n\}_{n=1}^N$, and $W_n \in \mathbb{C}^{L \times M}$. An autocorrelation of the $\{W_n\}_{n=1}^N$ is calculated as follows:

$$R_{W_n}(\varsigma, \tau) = \sum_{l=1}^{L}\sum_{m=1}^{M} W_n(l, m)W_n^*(l+\varsigma, m+\tau), \quad (2)$$

$-L+1 \leq \varsigma \leq L-1, -M+1 \leq \tau \leq M-1;$ where ς represents a translation in the direction of the y-axis. τ represents a translation in the direction of the x-axis, and (•)* represents a conjugation.

The omnidirectional beamforming matrix set $\{W_n\}_{n=1}^N$ satisfies the equation (3) as follows:

$$\sum_{n=1}^{N} R_{W_n}(\varsigma,\tau) = LMN \cdot \delta(\varsigma)\delta(\tau) \quad (3);$$

where the omnidirectional beamforming matrix set $\{W_n\}_{n=1}^N$ is (L,M,N)-ACM (autocorrelation complementary matrices). δ(ς) and δ(τ) are Kronecker functions, thus $$\delta(\varsigma) = \begin{cases} 1 & \varsigma = 0 \\ 0 & \varsigma \neq 0 \end{cases}.$$

When N=2, (L,M,N)-ACM is a pair of Golay complementary matrices (GCM).

In an embodiment, only when the matrix set $\{W_n\}_{n=1}^N$ constitutes the autocorrelation complementary matrices, the value of the signal strength $\sum_{n=1}^{N}|[\text{vec}(A(\varphi,\theta))^T \text{vec}(W_n)]|^2$ received by the terminal has nothing to do with the direction (φ,θ), that is, omnidirectional transmission is realized, where vec represents the vectorization of the rectangular array.

The proof process to achieve omnidirectional transmission is as follows.

$$u = \frac{d_y}{\lambda}\sin\varphi\sin\theta \text{ and } v = \frac{d_x}{\lambda}\sin\varphi\cos\theta$$

are plugged into $\sum_{n=1}^{N}|[\text{vec}(A(\varphi,\theta))^T\text{vec}(W_n)]|^2$, to obtain the equation (4) as follows:

$$\sum_{n=1}^{N}|[\text{vec}(A(\varphi, \theta))^T \text{vec}(W_n)]|^2 = \sum_{n=1}^{N}\left|\sum_{l=0}^{L-1}\sum_{m=0}^{M-1} W_n(l, m)e^{-j(lu+mv)}\right|^2; \quad (4)$$

where $W_n(l,m)$ is an element at a position (l,m) of $W_n$, and the equation (5) is obtained as follows:

$$\left|\sum_{l=0}^{L-1}\sum_{m=0}^{M-1} W_n(l, m)e^{-j(lu+mv)}\right|^2 = \quad (5)$$

$$\sum_{l=0}^{L-1}\sum_{m=0}^{M-1}\sum_{l'=0}^{L-1}\sum_{m'=0}^{M-1} W_n(l, m)W_n^*(l', m')e^{-j((l-l')u+(m-m')v)} =$$

$$\sum_{\varsigma=-L+1}^{L-1}\sum_{\tau=-M+1}^{M-1} R_{W_n}(\varsigma, \tau)e^{-j(u\varsigma+v\tau)}\left(\begin{array}{c}\tau \triangleq m-m' \\ \varsigma \triangleq l-l'\end{array}\right).$$

The equation (5) is plugged into the equation (4), to obtain the equation (6) as follows:

$$\sum_{n=1}^{N}|[\text{vec}(A(\varphi, \theta))^T \text{vec}(W_n)]|^2 = \sum_{\varsigma=-L+1}^{L-1}\sum_{\tau=-M+1}^{M-1}\sum_{n=1}^{N} R_{W_n}(\varsigma, \tau)e^{-j(u\varsigma+v\tau)}; \quad (6)$$

where $\{W_1, \ldots, W_N\}$ is autocorrelation complementary matrices. $\sum_{n=1}^{N} R_{W_n}(\varsigma,\tau) = LMN\delta(\varsigma)\delta(\tau)$ is plugged into the equation (6), and it can be obtained that the signal strength $\sum_{n=1}^{N}|[\text{vec}(A(\varphi,\theta))^T\text{vec}(W_n)]|^2 = LMN$ received by the terminal is a constant, that is, the signal strength received by the terminal has nothing to do with the angle (φ,θ), so as to realize an omnidirectional transmission.

In an embodiment, the complex Golay number is defined as $2^{a+f}3^b5^c11^d13^e$, where a, b, c, d, e, f≥0 are natural numbers; b+c+d+e≤a+2f+1; and f≤c+e.

Specifically, if a=1, b=0, c=0, d=0, e=0 and f=0, then the complex Golay number is $2^1 3^0 5^0 11^0 13^0=2$. If a=0, b=1, c=0, d=0, e=0 and f=0, then the complex Golay number is $2^0 3^1 5^0 11^0 13^0=3$. If a=2, b=0, c=0, d=0, e=0 and f=0, then the complex Golay number is $2^2 3^0 5^0 11^0 13^0=4$. If a=1, b=1, c=0, d=0, e=0 and f=0, then the complex Golay number is $2^1 3^1 5^0 11^0 13^0=6$, and so on.

It is assumed that the sequence a and the sequence b are as follows:

$a=(a_0, a_1, \ldots, a_{L-1}), b=(b_0, b_1, \ldots, b_{L-1});$

The aperiodic autocorrelation function of the sequence a is the equation (7) as follows:

$$R_a(\tau) = \sum_{k=0}^{L-1} a_k a_{k+\tau}^*, \quad -L+1 \leq \tau \leq L-1 \quad (7);$$

where L is the complex Golay number; the elements of the sequence a and the sequence b are any item in $\{1,j,-1,-j\}$ and satisfy the equation (8) as follows:

$$R_a(\tau)+R_b(\tau)=2L\delta(\tau) \quad (8);$$

where the sequence a and the sequence b are a pair of Golay complementary sequences.

In an embodiment, when half of the number of the rows L/2 and the number of the columns M of the uniform rectangular antenna array are both the complex Golay numbers, and the omnidirectional beamforming matrices constructed by a pair of Golay complementary matrices are shown in the equation (9) as follows:

$$W_1 = \begin{pmatrix} ac^T \\ bd^T \end{pmatrix}, W_2 = \begin{pmatrix} -a\tilde{d}^T \\ b\tilde{c}^T \end{pmatrix} \in \mathbb{C}^{L\times M}; \quad (9)$$

where $W_1$ and $W_2$ are a pair of Golay complementary matrices. A sequence a and a sequence b are a pair of Golay complementary sequences with a length of L/2, and a sequence c and a sequence d are a pair of Golay complementary sequences with a length of M.

$W_1$ and $W_2$ are plugged into the equation (2), the condition satisfies the equation (3) can be deduced. Therefore, $W_1$ and $W_2$ are a pair of Golay complementary matrices. $W_1$ and $W_2$ are plugged into $\Sigma_{n=1}^{N}|[\text{vec}(A(\varphi,\theta))^T\text{vec}(W_n)]|^2$, to obtain the equation (10) as follows:

$$\Sigma_{n=1}^{2}|[\text{vec}(A(\varphi,\theta)^T)\text{vec}(W_n)]|^2=2LM \quad (10);$$

Since 2LM is a constant, that is, the signal strength $\Sigma_{n=1}^{2}|[\text{vec}(A(\varphi,\theta)^T)\text{vec}(W_n)]|^2$ received by the terminal has nothing to do with the angle $(\varphi,\theta)$, the omnidirectional beamforming matrices constructed by the equation (9) satisfy the omnidirectional coverage condition.

In an embodiment, when the number of the rows L and half of the number of the columns M/2 of the uniform rectangular antenna array are both the complex Golay numbers, and the omnidirectional beamforming matrices constructed by a pair of Golay complementary matrices are shown in the equation (11) as follows:

$$W_1=(ca^T,db^T), W_2=(-\tilde{d}a^T,\tilde{c}b^T)\in \mathbb{C}^{L\times M} \quad (11);$$

where $W_1$ and $W_2$ are a pair of Golay complementary matrices. A sequence a and a sequence b are a pair of Golay complementary sequences with a length of M/2, and a sequence c and a sequence d are a pair of Golay complementary sequences with a length of L.

$W_1$ and $W_2$ are plugged into the equation (2), the condition satisfies the equation (3) can be deduced. Therefore, $W_1$ and $W_2$ are a pair of Golay complementary matrices. $W_1$ and $W_2$ are plugged into $\Sigma_{n=1}^{N}|[\text{vec}(A(\varphi,\theta))^T\text{vec}(W_n)]|^2$, to obtain the equation (12) as follows:

$$\Sigma_{n=1}^{2}|[\text{vec}(A(\varphi,\theta)^T)\text{vec}(W_n)]|^2=2LM \quad (12);$$

Since 2LM is a constant, that is, the signal strength $\Sigma_{n=1}^{2}|[\text{vec}(A(\varphi,\theta)^T)\text{vec}(W_n)]|^2$ received by the terminal has nothing to do with the angle $(\varphi,\theta)$, the omnidirectional beamforming matrices constructed by the equation (11) satisfy the omnidirectional coverage condition.

In an embodiment, when the number of the rows L and the number of the columns M of the uniform rectangular antenna array are both the complex Golay numbers, and the omnidirectional beamforming matrices constructed by four autocorrelation complementary matrices are shown in the equation (13) as follows:

$$W_1=ac^T, W_2=a\tilde{d}^T, W_3=bc^T, W_4=b\tilde{d}^T\in \mathbb{C}^{L\times M} \quad (13);$$

where $W_1$, $W_2$, $W_3$ and $W_4$ are four autocorrelation complementary matrices. A sequence a and a sequence b are a pair of Golay complementary sequences with a length of L, and a sequence c and a sequence d are a pair of Golay complementary sequences with a length of M.

$W_1$, $W_2$, $W_3$ and $W_4$ are plugged into the equation (2), and it can be deduced that $W_1$, $W_2$, $W_3$ and $W_4$ satisfy the condition of the equation (3). Therefore, $W_1$, $W_2$, $W_3$ and $W_4$ are four autocorrelation complementary matrices. $W_1$, $W_2$, $W_3$ and $W_4$ are plugged into $\Sigma_{n=1}^{N}|[\text{vec}(A(\varphi,\theta))^T\text{vec}(W_n)]|^2$, to obtain the equation (14) as follows:

$$\Sigma_{n=1}^{4}|[\text{vec}(A(\varphi,\theta)^T)\text{vec}(W_n)]|^2=4LM \quad (14);$$

Since 4LM is a constant, that is, the signal strength $\Sigma_{n=1}^{2}|[\text{vec}(A(\varphi,\theta)^T)\text{vec}(W_n)]|^2$ received by the terminal has nothing to do with the angle $(\varphi,\theta)$, the omnidirectional beamforming matrices constructed by the equation (13) satisfy the omnidirectional coverage condition.

Figure 3:
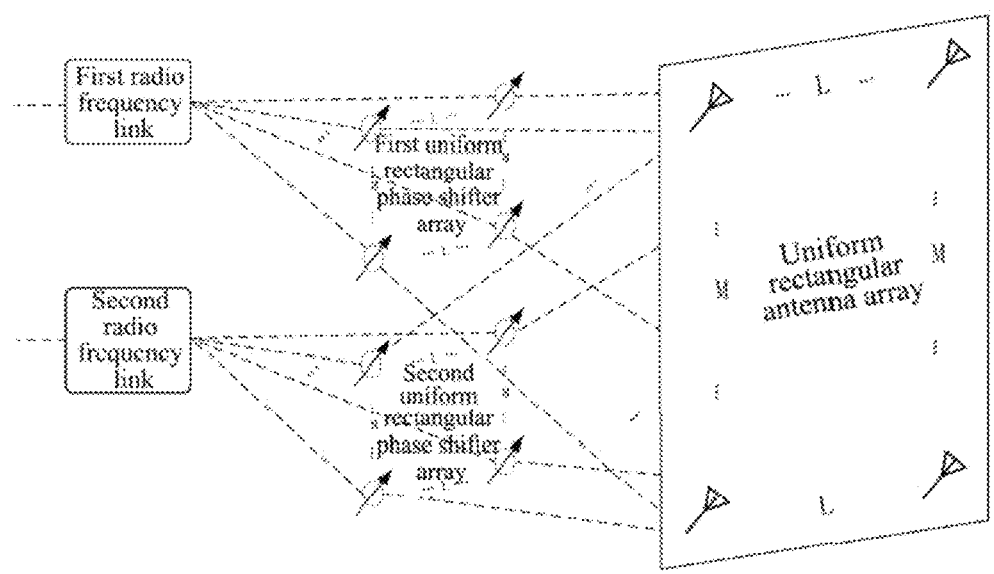
FIG. 3 is a schematic diagram of a fully connected beamforming structure according to an embodiment of the present disclosure.

In an embodiment, since the non-zero elements in the omnidirectional beamforming matrices have constant modulus properties, the fully connected beamforming structure shown in FIG. 3 may be adopted to implement the omnidirectional beamforming method.

In an embodiment, for a uniform rectangular antenna array consists of L×M antennas, the array response vector of the uniform rectangular antenna array at a spatial angle $(\varphi,\theta)$ can be obtained by the equation (1).

The space-time block coding is performed on the data stream to be sent, where the space-time block coding adopts Alamouti code, which is expressed as follows:

$$S = \begin{bmatrix} S_1 & S_2^* \\ S_2 & -S_1^* \end{bmatrix}.$$

According to the equation (9) of the equation (11), a pair of beamforming matrices $W_1$, $W_2 \in \mathbb{C}^{L\times M}$ is obtained, and the fully connected beamforming structure shown in FIG. 3 can be adopted.

Specifically, the fully connected beamforming structure includes a first radio frequency link, a second radio frequency link, a first uniform rectangular phase shifter array, a second uniform rectangular phase shifter array, and a uniform rectangular antenna array. The rectangular phase shifter array, the second uniform rectangular phase shifter array, and the uniform rectangular antenna array are all have the same number of rows L and the same number of columns M. The first radio frequency link is respectively connected to each phase shifter in the first uniform rectangular phase shifter array, and each phase shifter in the first uniform rectangular phase shifter array is connected to each antenna in the uniform rectangular antenna array in a one-to-one correspondence. The second radio frequency link is respectively connected to each phase shifter in the second uniform rectangular phase shifter array, and each phase shifter in the second uniform rectangular phase shifter array is connected to each antenna in the uniform rectangular antenna array in a one-to-one correspondence. The first uniform rectangular phase shifter array and the beamforming matrix $W_1$ have the same number of rows L and the same number of columns M. Each phase shifter in the first uniform rectangular phase shifter array performs phase adjustment through the corresponding element in the beamforming matrix $W_1$. The second uniform rectangular phase shifter array and the aforementioned beamforming matrix $W_2$ have the same number of rows L and the same number of columns M. Each phase shifter in the second uniform rectangular phase shifter array performs phase adjustment through the corresponding element in the beamforming matrix $W_2$, so that the signal strength received by the terminal has nothing to do with the angle $(\varphi,\theta)$.

In an embodiment, for a uniform rectangular antenna array consists of L×M antennas, the array response vector of the uniform rectangular antenna array at a spatial angle $(\varphi,\theta)$ can be obtained by the equation (1).

The space-time block coding is performed on the data stream to be sent, where the space-time block coding adopts 4×4 STBC code, which is expressed as follows:

$$S = \begin{bmatrix} S_1 & -S_2 & -S_3 & -S_4 \\ S_2 & S_1 & S_4 & -S_3 \\ S_3 & -S_4 & S_1 & S_2 \\ S_4 & S_3 & -S_2 & S_1 \end{bmatrix}.$$

Four beamforming matrices $W_1, W_2, W_3, W_4 \in \mathbb{C}^{L \times M}$ are obtained according to the equation (13), and the fully connected beamforming structure shown in FIG. 3 can be adopted.

S300) The beamforming is performed for the coded data stream through the omnidirectional beamforming matrices, to generate the signal to be sent of the uniform rectangular antenna array.

Specifically, the signal to be sent is as follows:

$$X(t) \triangleq \sum_{n=1}^{N} W_n s_n(t) \in \mathbb{C}^{L \times M};$$

X(t) is the signal to be sent. An integer t is an index of a time domain. $W_n \in \mathbb{C}^{L \times M}$ represents a spatial beamforming weight of $s_n(t)$. n=1, . . . , N, and N is a positive integer.

Figure 4:
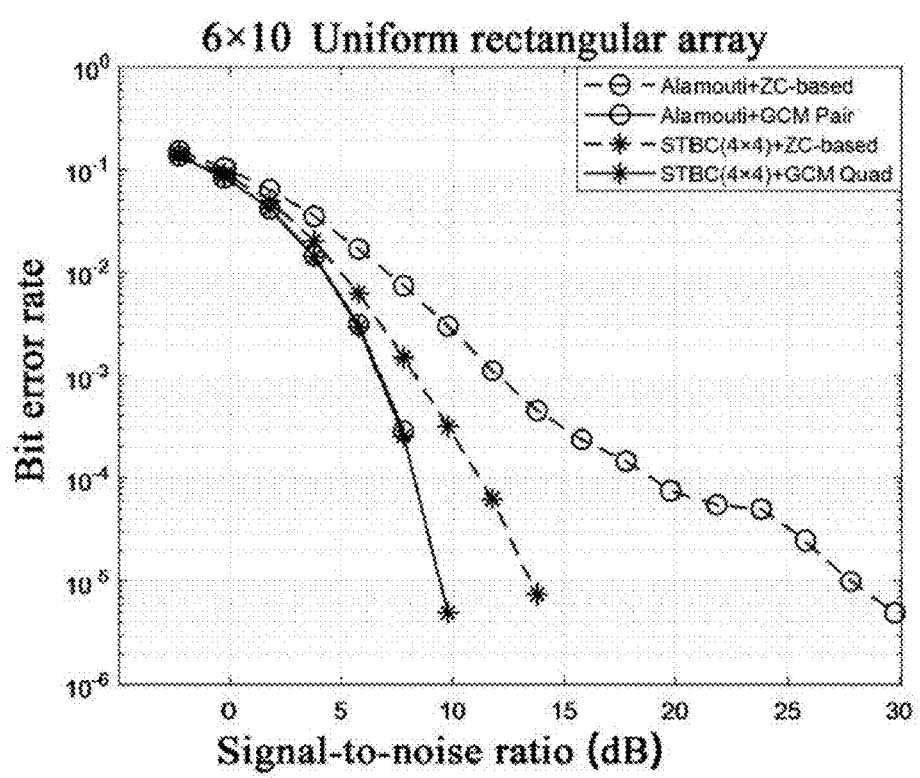
FIG. 4 is a performance chart of a bit error rate of the omnidirectional beamforming method according to an embodiment of the present disclosure.

In an embodiment, it is assumed that in a 6×10 uniform rectangular array, that is, L=6 and M=10. The binary phase shift keying (BPSK) modulation method is adopted to simulate the bit error rate performance of the omnidirectional beamforming method of the present disclosure. Specifically, the binary phase shift keying (BPSK) modulation method is adopted to simulate the ZC-based scheme of the comparative example (two Zadoff-Chu sequences are adopted as the Kronecker product to obtain the beamforming matrix). As shown in the simulation result in FIG. 4, it can be seen that compared with the ZC-based scheme, the omnidirectional beamforming method of the present disclosure has a lower bit error rate and the bit error rate has a faster downward trend. Therefore, the omnidirectional beamforming methods of the present disclosure have strong practicability and robustness.

In the omnidirectional beamforming method of the present disclosure, the coded data stream is obtained by performing a space-time block coding on the data stream to be sent; the omnidirectional beamforming matrices corresponding to the uniform rectangular antenna array are constructed; and the beamforming is performed on the coded data stream through the omnidirectional beamforming matrices, to generate a signal to be sent of the uniform rectangular antenna array. Through the arrangement in the present disclosure, the omnidirectional transmission of common signals can be realized, so that the signals to be sent have the same signal energy distribution in space, that is, the signals to be sent at any point in the space has the same energy, thereby improving the performance of the overall network.

Figure 5:
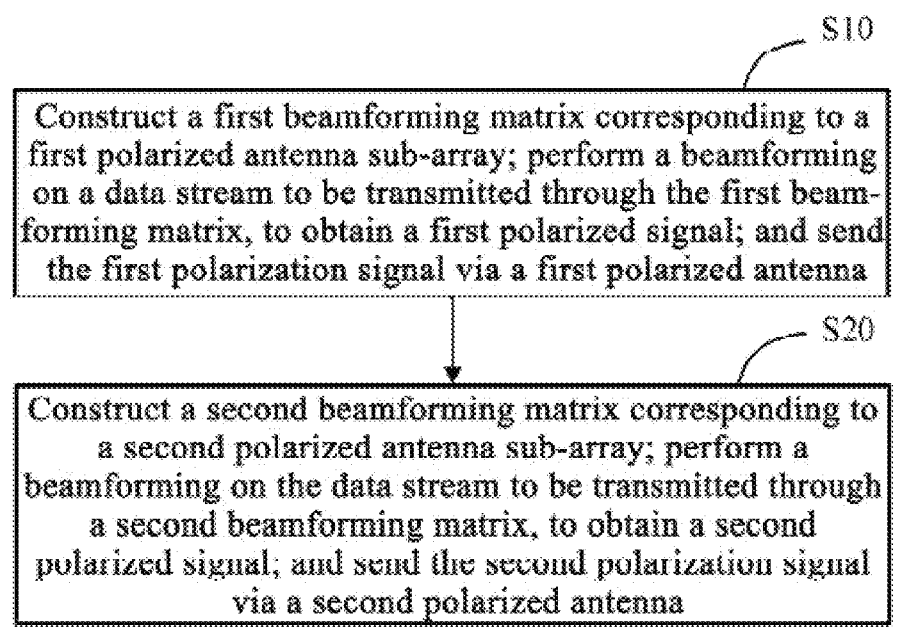
FIG. 5 is a flowchart of another omnidirectional beamforming method according to an embodiment of the present disclosure.

As shown in FIG. 5, in an embodiment, provided is another omnidirectional beamforming method, which is applied to the base station. The omnidirectional beamforming method specifically includes the following steps.

S10) A first beamforming matrix corresponding to a first polarized antenna sub-array is constructed. A beamforming is performed on a data stream to be sent through the first beamforming matrix, to obtain a first polarized signal. The first polarized signal is sent via the first polarized antenna sub-array.

S20) A second beamforming matrix corresponding to a second polarized antenna sub-array is constructed. A beamforming is performed on the data stream to be sent through the second beamforming matrix, to obtain a second polarized signal. The second polarized signal is sent via the second polarized antenna sub-array.

In the embodiment, the first polarized antenna sub-array is a left-polarized antenna sub-array, and the first beamforming matrix is a left-polarized beamforming matrix. The second polarized antenna sub-array is a right-polarized antenna sub-array, and the second beamforming matrix is a right-polarized beamforming matrix.

Optionally, the first polarized antenna sub-array is a horizontally polarized antenna sub-array, and the first beamforming matrix is a horizontally polarized beamforming matrix. The second polarized antenna sub-array is a vertically polarized antenna sub-array, and the second beamforming matrix is a vertically polarized beamforming matrix.

Specifically, the left-polarized beamforming matrix corresponding to the left-polarized antenna sub-array and the right-polarized beamforming matrix corresponding to the right-polarized antenna sub-array are constructed through a pair of Golay complementary matrices.

In an embodiment, the left-polarized antenna sub-array and the right-polarized antenna sub-array together form a uniform rectangular antenna array.

In an embodiment, the uniform rectangular antenna array consists of L×M antennas. L is the number of rows of the uniform rectangular antenna array. M is the number of columns of the uniform rectangular antenna array. An array response vector of the uniform rectangular antenna array at a spatial angle $(\varphi,\theta)$ is calculated as follows:

$$[A(\varphi, \theta)]_{lm} = e^{-j\frac{2\pi}{\lambda}(l-1)d_y \sin\varphi\sin\theta - j\frac{2\pi}{\lambda}(m-1)d_x \sin\varphi\cos\theta}, \quad (15)$$

for $l = 1, 2, \ldots, L; m = 1, 2, \ldots, M;$ $\theta \in [0, 2\pi]; \varphi \in [0, \pi];$ where $[A(\varphi,\theta)]_{lm}$ represents the array response vector of the uniform rectangular antenna array. The array response vector is a response capability of the antennas in the uniform rectangular antenna array to an incoming wave in a certain direction. As shown in FIG. 2, a spatial rectangular coordinate system is established, where a coordinate origin is a point of a plane where the uniform rectangular antenna array is located; the plane where the uniform rectangular antenna array is located is a xoy plane; and a z-axis is a normal vector of the plane where the uniform rectangular antenna array is located. $\varphi$ represents an angle between a transmission direction of a signal to be sent and the z-axis in the spatial rectangular coordinate system. $\theta$ represents an angle between a projection of the transmission direction of the signal to be sent on the xoy plane and an x-axis in the spatial rectangular coordinate system. λ represents a wavelength of the signal to be sent. $d_x$ represents a distance between two adjacent antennas in the uniform rectangular antenna array in a direction of the x-axis. $d_y$ represents a distance between two adjacent antennas in the uniform rectangular antenna array in direction of a y-axis.

It is assumed that the left-polarized beamforming matrix and the right-polarized beamforming matrix of the uniform rectangular antenna array beamforming are respectively $W_{left}$ and $W_{right}$, where $W_{left}$ and $$W_{right} \in \mathbb{C}^{L \times \frac{M}{2}}.$$

An autocorrelation of the left-polarized beamforming matrix and the right-polarized beamforming matrix is calculated as follows:

$$R_{W_{left}}(\varsigma, \tau) = \sum_{l=1}^{L} \sum_{m=1}^{\frac{M}{2}} W_{left}(l, m) W_{left}^*(l+\varsigma, m+\tau), \tag{16}$$

$$R_{W_{right}}(\varsigma, \tau) = \sum_{l=1}^{L} \sum_{m=1}^{\frac{M}{2}} W_{right}(l, m) W_{right}^*(l+\varsigma, m+\tau),$$

$$-L+1 \leq \varsigma \leq L-1,$$

$$-\frac{M}{2}+1 \leq \tau \leq \frac{M}{2}-1;$$

where ç represents a translation in the direction of the y-axis; τ represents a translation in the direction of the x-axis, and (•)* represents a conjugation.

The left-polarized beamforming matrix $W_{left}$ and the right-polarized beamforming matrix $W_{right}$ satisfy the condition of the equation (17) as follows:

$$R_{W_{left}}(\varsigma,\tau) + R_{W_{right}}(\varsigma,\tau) = LM \cdot \delta(\varsigma)\delta(\tau) \tag{17}$$

where the left-polarized beamforming matrix $W_{left}$ and the right-polarized beamforming matrix $W_{right}$ are (L, M, 2)-ACM, that is, autocorrelation complementary matrices (ACM), and are also Golay complementary matrices (GCM). δ(ç) and δ(τ) both are a Kronecker delta function, that is, $$\delta(\varsigma) = \begin{cases} 1 & \varsigma = 0 \\ 0 & \varsigma \neq 0 \end{cases}.$$

In an embodiment, only when the left-polarized beamforming matrix $W_{left}$ and the right-polarized beamforming matrix $W_{right}$ are Golay complementary matrices, the value of the signal strength $P_{x-pol}(\varphi,\theta)$ received by the terminal has nothing to do with the direction $(\varphi,\theta)$, that is, omnidirectional transmission is realized, where vec represents the vectorization of the rectangular array.

The proof process to achieve omnidirectional transmission is as follows.

$$u = \frac{d_y}{\lambda} \sin\varphi\sin\theta \text{ and } v = \frac{d_x}{\lambda} \sin\varphi\cos\theta$$

are plugged into $P_{x-pol}(\varphi,\theta)$, to obtain the equation (18) as follows:

$$P_{x-pol}(\varphi, \theta) \triangleq \tag{18}$$

$$|vec(A_{left}(\varphi, \theta))^T vec(W_{left})|^2 + |vec(A_{right}(\varphi, \theta))^T vec(W_{right})|^2 =$$

$$\left| \sum_{l=0}^{L-1} \sum_{m=0}^{\frac{M}{2}-1} W_{left}(l, m) e^{-j(lu+mv)} \right|^2 + \left| \sum_{l=0}^{L-1} \sum_{m=0}^{\frac{M}{2}-1} W_{right}(l, m) e^{-j(lu+mv)} \right|^2;$$

where $W_{left}(l,m)$ is an element at a position (l,m) of $W_{left}$, and $W_{right}(l,m)$ is an element at a position (l,m) of $W_{right}$, so that the equation (19) is obtained as follows:

$$\left| \sum_{l=0}^{L-1} \sum_{m=0}^{\frac{M}{2}-1} W_{left}(l, m) e^{-j(lu+mv)} \right|^2 = \tag{19}$$

$$\sum_{l=0}^{L-1} \sum_{m=0}^{\frac{M}{2}-1} \sum_{l'=0}^{L-1} \sum_{m'=0}^{\frac{M}{2}-1} W_{left}(l,m) W_{left}^*(l',m') e^{-j((l-l')u+(m-m')v)} =$$

$$\sum_{\varsigma=-L+1}^{L-1} \sum_{\tau=-\frac{M}{2}+1}^{\frac{M}{2}-1} R_{W_{left}}(\varsigma, \tau) e^{-j(u\varsigma+v\tau)} \begin{pmatrix} \tau \triangleq m-m' \\ \varsigma \triangleq l-l' \end{pmatrix}$$

$$\left| \sum_{l=0}^{L-1} \sum_{m=0}^{\frac{M}{2}-1} W_{right}(l, m) e^{-j(lu+mv)} \right|^2 =$$

$$\sum_{l=0}^{L-1} \sum_{m=0}^{\frac{M}{2}-1} \sum_{l'=0}^{L-1} \sum_{m'=0}^{\frac{M}{2}-1} W_{right}(l,m) W_{right}^*(l',m') e^{-j((l-l')u+(m-m')v)} =$$

$$\sum_{\varsigma=-L+1}^{L-1} \sum_{\tau=-\frac{M}{2}+1}^{\frac{M}{2}-1} R_{W_{right}}(\varsigma, \tau) e^{-j(u\varsigma+v\tau)} \begin{pmatrix} \tau \triangleq m-m' \\ \varsigma \triangleq l-l' \end{pmatrix}.$$

The equation (19) is plugged into the equation (18), to obtain the equation (20) as follows:

$$P_{x-pol}(\varphi, \theta) = \tag{20}$$

$$\sum_{\varsigma=-L+1}^{L-1} \sum_{\tau=-\frac{M}{2}+1}^{\frac{M}{2}-1} \left( R_{W_{left}}(\varsigma,\tau) e^{-j(u\varsigma+v\tau)} + R_{W_{right}}(\varsigma,\tau) e^{-j(u\varsigma+v\tau)} \right);$$

where $W_{left}$ and $W_{right}$ are Golay complementary matrices. The equation (17) is plugged into the equation (20), and it can be obtained that the signal strength $P_{x-pol}(\varphi,\theta)=LM$ received by the terminal is a constant, that is, the signal strength received by the terminal has nothing to do with the angle $(\varphi,\theta)$, so as to realize an omnidirectional transmission.

In an embodiment, the complex Golay number is defined as $2^{a+f} 3^b 5^c 11^d 13^e$, where a, b, c, d, e, f≥0 are natural numbers; b+c+d+e≤a+2f+1; and f≤c+e.

Specifically, if a=1, b=0, c=0, d=0, e=0 and f=0, then the complex Golay number is $2^1 3^0 5^0 11^0 13^0 = 2$. If a=0, b=1, c=0, d=0, e=0 and f=0, then the complex Golay number is $2^0 3^1 5^0 11^0 13^0 = 3$. If a=2, b=0, c=0, d=0, e=0 and f=0, then the complex Golay number is $2^2 3^0 5^0 11^0 13^0=4$. If a=1, b=1, c=0, d=0, e=0 and f=0, then the complex Golay number is $2^1 3^1 5^0 11^0 13^0=6$, and so on.

It is assumed that the sequence a and the sequence b with a length of L are as follows:

$a=(a_0, a_1, \ldots, a_{L-1})$, $b=(b_0, b_1, \ldots, b_{L-1})$.

The aperiodic autocorrelation function of the sequence a is the equation (21) as follows:

$$R_a(\tau)=\Sigma_{k=0}^{L-1}a_k a_{k+\tau}^*, \ -L+1\leq\tau\leq L-1 \quad (21);$$

where L is the complex Golay number, and the elements of the sequence a and the sequence b are any item in $\{1, j, -1, -j\}$ and satisfy the condition of the equation (22) as follows:

$$R_a(\tau)+R_b(\tau)=2L\delta(\tau) \quad (22);$$

Where the sequence a and the sequence b are a pair of Golay complementary sequences.

In an embodiment, when half of the number of rows L/2 and the number of columns M/2 of the left-polarized antenna sub-array and the right-polarized antenna sub-array are both complex Golay numbers, the left-polarized beamforming matrix and the right-polarized beamforming matrix constructed by a pair of Golay complementary matrices are the equation (23) as follows:

$$W_{left}=\begin{pmatrix}ac^T\\bd^T\end{pmatrix}, W_{right}=\begin{pmatrix}-a\tilde{d}^T\\b\tilde{c}^T\end{pmatrix}\in\mathbb{C}^{L\times\frac{M}{2}}; \quad (23)$$

where $W_{left}$ is the left-polarized beamforming matrix, and $W_{right}$ is the right-polarized beamforming matrix. $W_{left}$ and $W_{right}$ are a pair of Golay complementary matrices. The sequence a and the sequence b are a pair of Golay complementary sequences with a length of L/2, and the sequence c and the sequence d are a pair of Golay complementary sequences with a length of M/2. (•) represents a conjugate flip operation.

$W_{left}$ and $W_{right}$ are respectively plugged into the equation (16), and it can be deduced that $W_{left}$ and $W_{right}$ both satisfy the equation (17). Therefore, $W_{left}$ and $W_{right}$ are a pair of Golay complementary matrices, and $W_{left}$ and $W_{right}$ are plugged into $P_{x-pol}(\varphi,\theta)$, to obtain the equation (24) as follows:

$$P_{x-pol}(\varphi,\theta)=LM \quad (24).$$

Since LM is a constant, that is, the signal strength $P_{x-pol}(\varphi,\theta)$ received by the terminal has nothing to do with the angle $(\varphi,\theta)$, the left-polarized beamforming matrix and the right-polarized beamforming matrix constructed by the equation (23) satisfy the omnidirectional coverage condition.

In an embodiment, when the number of rows L and half of the number of columns M/4 of the left-polarized antenna sub-array and the number of rows L and half of the number of columns M/4 of the right-polarized antenna sub-array are both complex Golay numbers, the omnidirectional beamforming matrices constructed by a pair of Golay complementary matrices are shown in the equation (25) as follows:

$$W_{left}=(ca^T, db^T), W_{right}=(-\tilde{d}a^T, \tilde{c}b^T)\in\mathbb{C}^{L\times\frac{M}{2}}; \quad (25)$$

where $W_{left}$ is the left-polarized beamforming matrix, and $W_{right}$ is the right-polarized beamforming matrix. $W_{left}$ and $W_{right}$ are a pair of Golay complementary matrices. The sequence a and the sequence b are a pair of Golay complementary sequences with a length of M/4, and the sequence c and the sequence d are a pair of Golay complementary sequences with a length of L. (•) represents a conjugate flip operation.

$W_{left}$ and $W_{right}$ are respectively plugged into the equation (16), and it can be deduced that $W_{left}$ and $W_{right}$ both satisfy the equation (17). Therefore, $W_{left}$ and $W_{right}$ are a pair of Golay complementary matrices, and $W_{left}$ and $W_{right}$ are plugged into $P_{x-pol}(\varphi,\theta)$, to obtain the equation (26) as follows:

$$P_{x-pol}(\varphi,\theta)=LM \quad (26).$$

Since LM is a constant, that is, the signal strength $P_{x-pol}(\varphi,\theta)$ received by the terminal has nothing to do with the angle $(\varphi,\theta)$, the left-polarized beamforming matrix and the right-polarized beamforming matrix constructed by the equation (25) satisfy the omnidirectional coverage condition.

In an embodiment, for a uniform rectangular antenna array composed of L×M antennas, the array response vector of the uniform rectangular antenna array at a spatial angle $(\varphi,\theta)$ can be obtained by the equation (15).

When the base station adopts orthogonal dual-polarized antennas to transmit the data stream to be sent to the terminal, the calculation formula corresponding to the signal strength received by the terminal is as follows:

$$y(t)=\begin{bmatrix}vec(A_{left}(\varphi,\theta))^T & 0\\0 & vec(A_{right}(\varphi,\theta))^T\end{bmatrix}\begin{bmatrix}vec(W_{left})\\vec(W_{right})\end{bmatrix}s(t)+ \quad (27)$$

$$z(t)=\begin{bmatrix}vec(A_{left}(\varphi,\theta))^T vec(W_{left})\\vec(A_{right}(\varphi,\theta))^T vec(W_{right})\end{bmatrix}s(t)+z(t);$$

where $A_{left}(\varphi,\theta)$ represents an array response vector of the left-polarized antenna sub-array, and $A_{right}(\varphi,\theta)$ represents an array response vector of the right-polarized antenna sub-array. $W_{left}$ is the left-polarized beamforming matrix, and $W_{right}$ is the right-polarized beamforming matrix. $W_{left}$ and $W_{right}$ are a pair of Golay complementary matrices.

$$A_{left}(\varphi,\theta)\in\mathbb{C}^{L\times\frac{M}{2}}.$$

The range or l is $$0\leq l\leq\frac{L}{2}-1. \ A_{right}(\varphi,\theta)=e^{j\frac{2\pi}{\lambda}(\frac{M}{2}-1)d_x\sin\varphi\cos\theta}A_{left}(\varphi,\theta),$$

and t is a time index.

Specifically, in the present disclosure, the beamforming is performed on the data stream to be sent through the left-polarized beamforming matrix, to generate the first signal corresponding to the left-polarized beamforming matrix. The beamforming is performed on the data stream to be sent through the right-polarized beamforming matrix, to generate the second signal corresponding to the right-polarized beamforming matrix. The left-polarized antenna sub-array performs left polarization processing on the first signal, to obtain the left-polarized signal to be sent, and the right-polarized antenna sub-array performs right polarization processing on the second signal to obtain a right-polarized signal to be sent, where the left-polarized signal to be sent and the right-polarized signal to be sent are in an orthogonal relationship. When the terminal receives the left-polarized signal sent by the left-polarized antenna sub-array through the first antenna and the right-polarized signal sent by the right-polarized antenna sub-array through the second antenna, the terminal combines the left-polarized signal and the right-polarized signal.

Figure 6A:
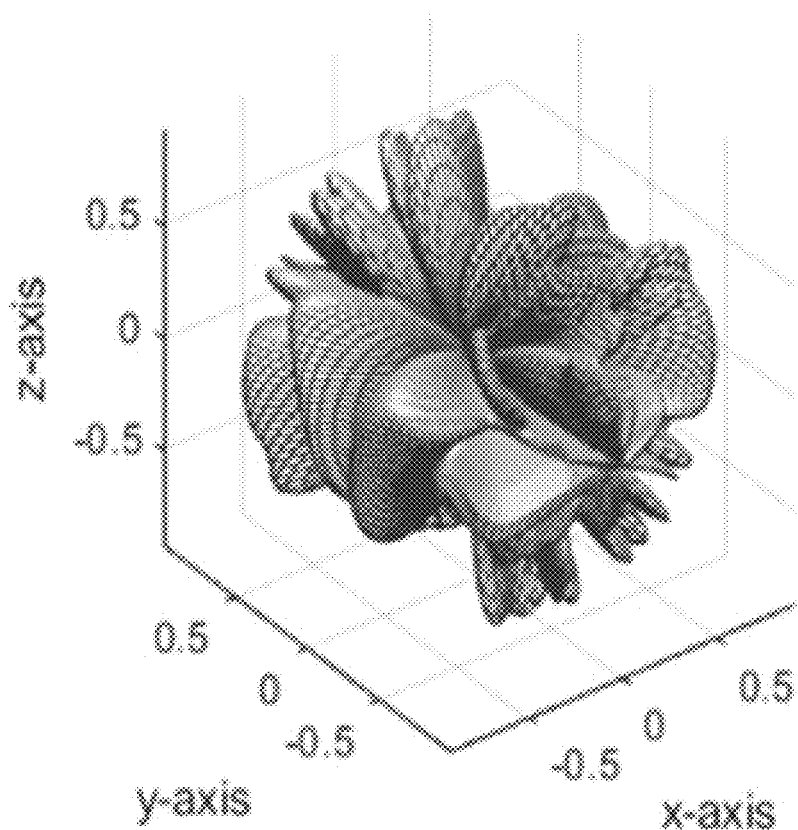
FIG. 6a is a spatial beam pattern of a beamforming based on a left-polarized beamforming matrix according to an embodiment of the present disclosure.
Figure 6B:
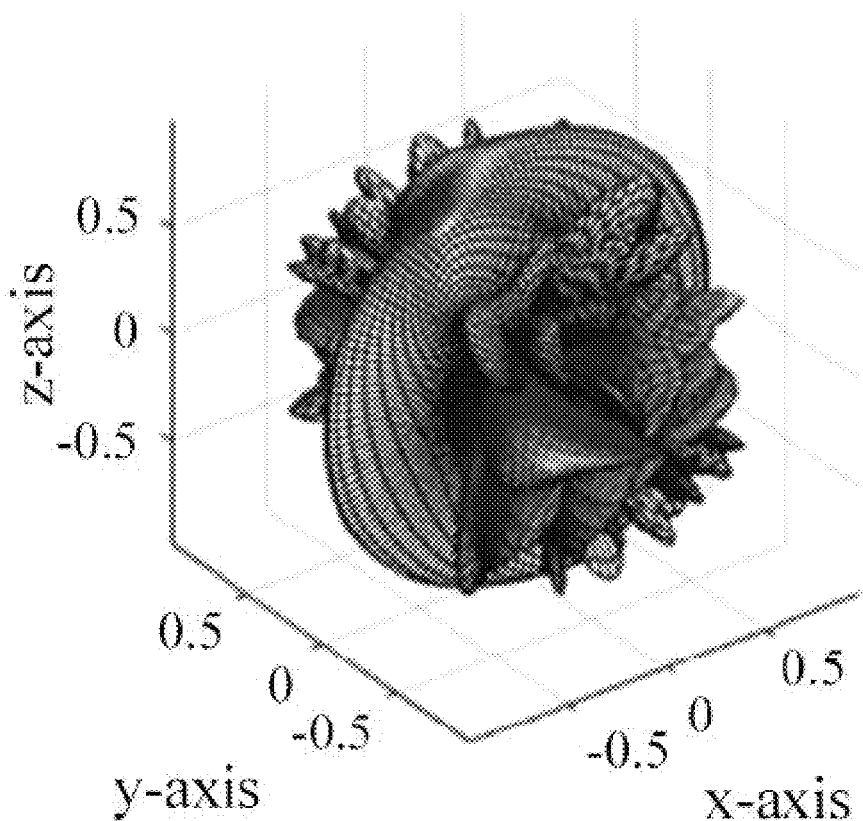
FIG. 6b is a spatial beam pattern of a beamforming based on a right-polarized beamforming matrix according to an embodiment of the present disclosure.
Figure 6C:
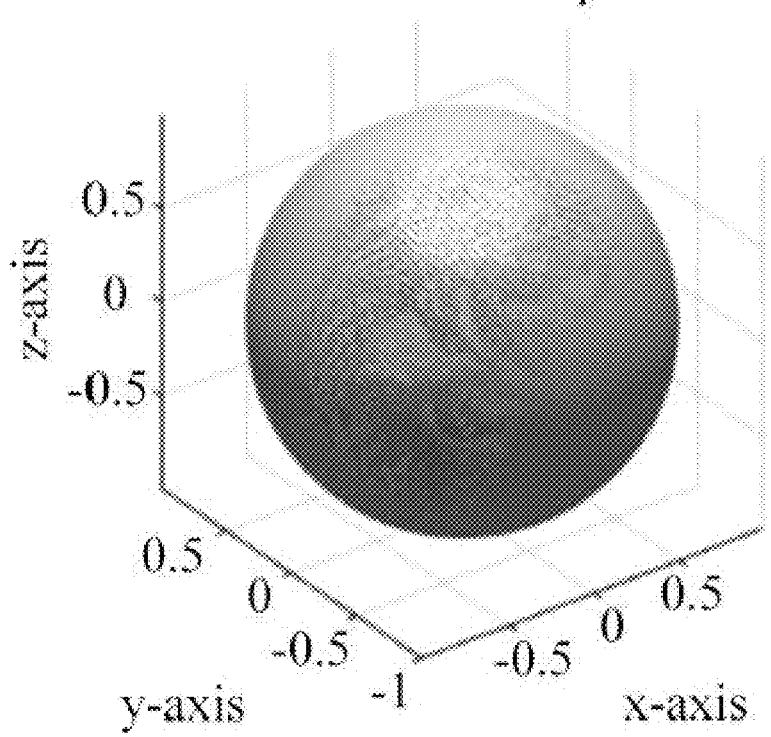
FIG. 6c is a spatial beam pattern after combining the beamforming of FIG. 6a and the beamforming of FIG. 6b according to an embodiment of the present disclosure.

As shown in FIGS. 6a-6c, the terminal combines the received left-polarized signal and right-polarized signal, and the calculation formula corresponding to the combined signal strength is as follows:

$$P_{x\text{-}pol}(\varphi,\theta)$$
$$\triangleq |\text{vec}(A_{left}(\varphi,\theta))^T \text{vec}(W_{left})|^2$$
$$+ |\text{vec}(A_{right}(\varphi,\theta))^T \text{vec}(W_{right})|^2 \quad (28);$$

where $P_{x\text{-}pol}(\varphi,\theta)$ represents the combined signal strength of the left polarization signal and right polarization signal. According to the equation (25), obtained $$W_{left}, W_{right} \in \mathbb{C}^{L \times \frac{M}{2}}.$$

Figure 7:
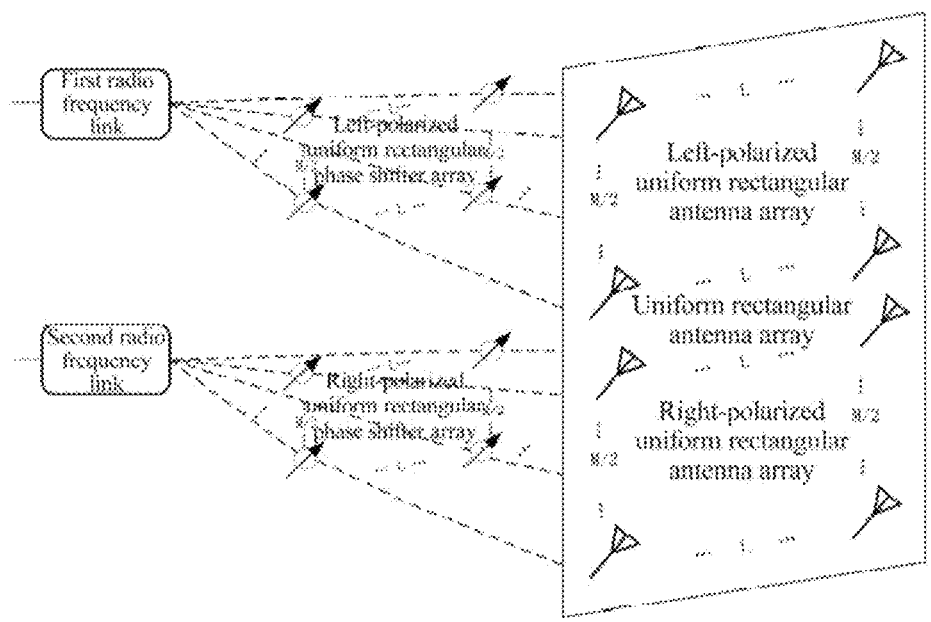
FIG. 7 is a schematic diagram of a partially connected beamforming structure according to an embodiment of the present disclosure.

The partially connected beamforming structure shown in FIG. 7 can be adopted.

Specifically, the partially connected beamforming structure includes a first radio frequency link, a second radio frequency link, a left-polarized uniform rectangular phase shifter array, a right-polarized uniform rectangular phase shifter array, and a uniform rectangular antenna array. The uniform rectangular antenna array includes a left-polarized antenna sub-array and a right-polarized antenna sub-array. The left-polarized uniform rectangular phase shifter array, the right-polarized uniform rectangular phase shifter array, the left-polarized antenna sub-array, and the right-polarized antenna sub-array are all have the same number of rows L and the same number of columns M/2. The first radio frequency link is respectively connected to each phase shifter in the left-polarized uniform rectangular phase shifter array, and each phase shifter in the left-polarized uniform rectangular phase shifter array is connected to each antenna in the left-polarized antenna sub-array in a one-to-one correspondence. The first radio frequency link is respectively connected to each phase shifter in the right-polarized uniform rectangular phase shifter array, and each phase shifter in the right-polarized uniform rectangular phase shifter array is connected to each antenna in the right-polarized antenna sub-array in a one-to-one correspondence. The left-polarized uniform rectangular phase shifter array and the left-polarized beamforming matrix $A_{left}$ have the same number of rows L and the number of columns M/2. Each phase shifter in the left-polarized uniform rectangular phase shifter array performs phase adjustment through the corresponding element in the left-polarized beamforming matrix $A_{left}$. The right-polarized uniform rectangular phase shifter array and the aforementioned right-polarized beamforming matrix $A_{right}$ have the same number of rows L and the same number of columns M/2. Each phase shifter in the right-polarized uniform rectangular phase shifter array performs phase adjustment through the corresponding element in the right-polarized beamforming matrix $A_{right}$, so that the signal strength received by the terminal has nothing to do with the angle $(\varphi,\theta)$.

Figure 8:
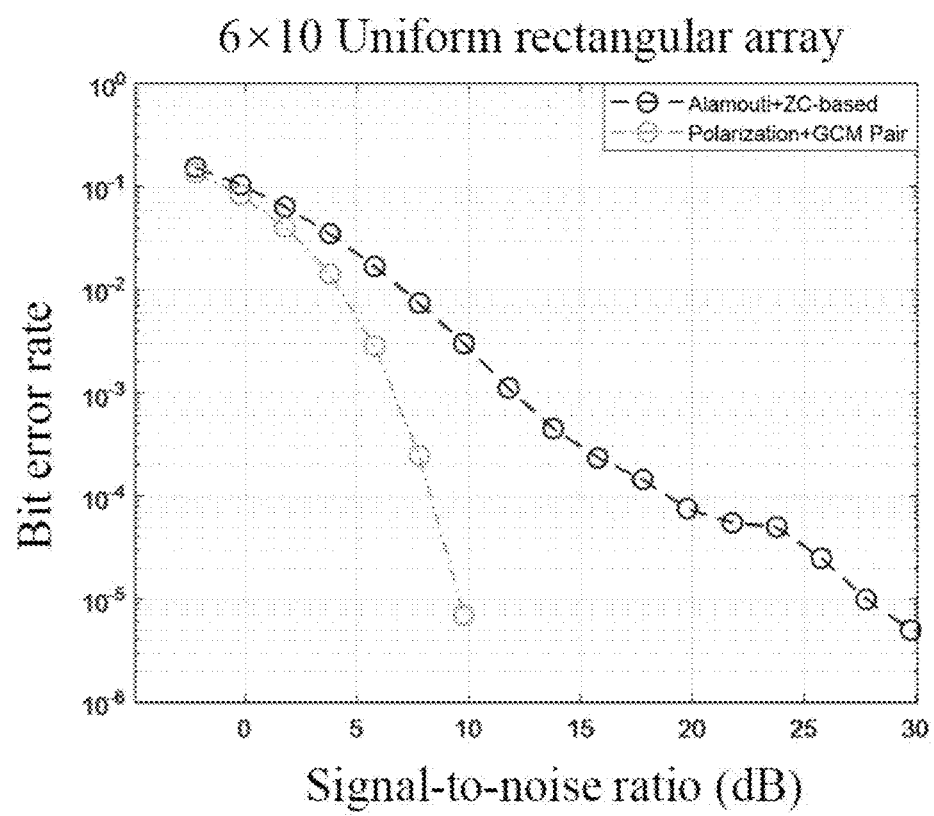
FIG. 8 is a performance diagram of a bit error rate of another omnidirectional beamforming method according to an embodiment of the present disclosure.

In an embodiment, it is assumed that in a 6×10 uniform rectangular array, that is, L=6 and M=10. The binary phase shift keying (BPSK) modulation method is adopted to simulate the bit error rate performance of the omnidirectional beamforming method of the present disclosure. Specifically, the binary phase shift keying (BPSK) modulation method is adopted to simulate the ZC-based scheme of the comparative example (two Zadoff-Chu sequences are adopted as the Kronecker product to obtain the beamforming matrix). As shown in the simulation result in FIG. 8, it can be seen that compared with the ZC-based scheme, the omnidirectional beamforming method of the present disclosure has a lower bit error rate and the bit error rate has a faster downward trend. Therefore, the omnidirectional beamforming methods of the present disclosure have strong practicability and robustness.

In the omnidirectional beamforming method of the present disclosure, the left-polarized beamforming matrix corresponding to the left-polarized antenna sub-array is constructed, and the right-polarized beamforming matrix corresponding to the right-polarized antenna sub-array is constructed. The beamforming is performed on the data stream to be sent through the left-polarized beamforming matrix, to generate the first signal corresponding to the left-polarized beamforming matrix. The beamforming is performed on the data stream to be sent through the right-polarized beamforming matrix, to generate a second signal corresponding to the right-polarized beamforming matrix. The left-polarized signal to be sent is obtained by performing a left polarization processing on the first signal, and the right-polarized signal to be sent is obtained by performing a right polarization processing on the second signal. The left-polarized signal to be sent and the right-polarized signal to be sent are in an orthogonal relationship. Through the arrangement in the present disclosure, the omnidirectional transmission of common signals can be realized, so that the signals to be transmitted have the same signal energy distribution in space, that is, the signals to be transmitted at any point in the space has the same energy, thereby improving the performance of the overall network.

Described above are only the preferred embodiments of the present disclosure, but not to limit the scope of the present disclosure. Under the inventive concept of the present disclosure, equivalent structural transformations made through the contents of the description and drawings of the present disclosure, or direct/indirect application of the present disclosure to other related technical fields should fall within the scope of patent protection of the present disclosure.

What is claimed is:

1. An omnidirectional beamforming method, comprising:
   performing a space-time block coding on a data stream to be sent, to obtain a coded data stream;
   constructing omnidirectional beamforming matrices corresponding to a uniform rectangular antenna array through a pair of Golay complementary matrices or four autocorrelation complementary matrices;
   wherein the uniform rectangular antenna array consists of L×M antennas; L is the number of rows of the uniform rectangular antenna array; M is the number of columns of the uniform rectangular antenna array; an array response vector of the uniform rectangular antenna array at a spatial angle of $(\varphi,\theta)$ is calculated as follows:

$$[A(\varphi, \theta)]_{lm} = e^{-j\frac{2\pi}{\lambda}(l-1)d_y \sin\varphi\sin\theta - j\frac{2\pi}{\lambda}(m-1)d_x \sin\varphi\cos\theta},$$

for $l = 1, 2, \ldots, L; m = 1, 2, \ldots, M$;

$\theta \in [0, 2\pi]; \varphi \in [0, \pi]$;

wherein $[A(\varphi,\theta)]_{lm}$ represents the array response vector of the uniform rectangular antenna array; the array response vector is a response capability of the antennas in the uniform rectangular antenna array to an incoming wave in a certain direction; a spatial rectangular coordinate system is established, wherein a coordinate origin is a point of a plane where the uniform rectangular antenna array is located; the plane where the uniform rectangular antenna array is located is a xoy plane; and a z-axis is a normal vector of the plane where the uniform rectangular antenna array is located; $\varphi$ represents an angle between a transmission direction of a signal to be sent and the z-axis in the spatial rectangular coordinate system; $\theta$ represents an angle between a projection of the transmission direction of the signal to be sent on the xoy plane and an x-axis in the spatial rectangular coordinate system; $\lambda$ represents a wavelength of the signal to be sent; $d_x$ represents a distance between two adjacent antennas in the uniform rectangular antenna array in a direction of the x-axis; and $d_y$ represents a distance between two adjacent antennas in the uniform rectangular antenna array in a direction of a y-axis;

assuming that an omnidirectional beamforming matrix set formed by performing beamforming on the uniform rectangular antenna array is $\{W_n\}_{n=1}^N$; wherein $W_n \in \mathbb{C}^{L \times M}$; an autocorrelation of the $\{W_n\}_{n=1}^N$ is calculated as follows:

$$R_{W_n}(\varsigma, \tau) = \sum_{l=1}^{L} \sum_{m=1}^{M} W_n(l,m) W_n^*(l+\varsigma, m+\tau),$$

$-L+1 \leq \varsigma \leq L-1, -M+1 \leq \tau \leq M-1$;

wherein $\varsigma$ represents a translation in the direction of they-axis; $\tau$ represents a translation in the direction of the x-axis; and $(\cdot)^*$ represents a conjugation;

the omnidirectional beamforming matrix set $\{W_n\}_{n=1}^N$ satisfies the following equation:

$\sum_{n=1}^{N} R_{W_n}(\varsigma,\tau) = LMN \cdot \delta(\varsigma)\delta(\tau)$;

wherein the omnidirectional beamforming matrix set $\{W_n\}_{n=1}^N$ is autocorrelation complementary matrices (L,M,N)-ACM; $\delta(\varsigma)$ and $\delta(\tau)$ are both a Kronecker delta functions $$\delta(\varsigma) = \begin{cases} 1 & \varsigma = 0 \\ 0 & \varsigma \neq 0 \end{cases};$$

when N=2, (L,M,N)-ACM is a pair of Golay complementary matrices; and performing beamforming on the coded data stream through the omnidirectional beamforming matrices, to generate the signal to be sent of the uniform rectangular antenna array;

wherein the omnidirectional beamforming matrices are shown as follows:

$$W_1 = \begin{pmatrix} ac^T \\ bd^T \end{pmatrix}, W_2 = \begin{pmatrix} -a\tilde{d}^T \\ b\tilde{c}^T \end{pmatrix} \in \mathbb{C}^{L \times M};$$

wherein half of the number of the rows L/2 and the number of the columns M of the uniform rectangular antenna array are both complex Golay numbers; $W_1$ and $W_2$ are a pair of Golay complementary matrices; a sequence a and a sequence b are a pair of Golay complementary sequences with a length of L/2; and a sequence c and a sequence d are a pair of Golay complementary sequences with a length of M.

2. The omnidirectional beamforming method of claim 1, wherein the signal to be sent is shown as follows:

$X(t) \triangleq \sum_{n=1}^{N} W_n s_n(t) \in \mathbb{C}^{L \times M}$;

wherein X(t) is the signal to be sent; an integer t is an index of a time domain; $W_n \in \mathbb{C}^{L \times M}$ represents a spatial beamforming weight of $s_n(t)$; wherein n=1, ..., N, and N is a positive integer.

3. An omnidirectional beamforming method, comprising:
performing a space-time block coding on a data stream to be sent, to obtain a coded data stream;
constructing omnidirectional beamforming matrices corresponding to a uniform rectangular antenna array through a pair of Golay complementary matrices or four autocorrelation complementary matrices;
wherein the uniform rectangular antenna array consists of L×M antennas; L is the number of rows of the uniform rectangular antenna array; M is the number of columns of the uniform rectangular antenna array; an array response vector of the uniform rectangular antenna array at a spatial angle of $(\varphi,\theta)$ is calculated as follows:

$$[A(\varphi, \theta)]_{lm} = e^{-j\frac{2\pi}{\lambda}(l-1)d_y \sin\varphi\sin\theta - j\frac{2\pi}{\lambda}(m-1)d_x \sin\varphi\cos\theta},$$

for $l = 1, 2, \ldots, L; m = 1, 2, \ldots, M$;

$\theta \in [0, 2\pi]; \varphi \in [0, \pi]$;

wherein $[A(\varphi,\theta)]_{lm}$ represents the array response vector of the uniform rectangular antenna array; the array response vector is a response capability of the antennas in the uniform rectangular antenna array to an incoming wave in a certain direction; a spatial rectangular coordinate system is established, wherein a coordinate origin is a point of a plane where the uniform rectangular antenna array is located; the plane where the uniform rectangular antenna array is located is a xoy plane; and a z-axis is a normal vector of the plane where the uniform rectangular antenna array is located; $\varphi$ represents an angle between a transmission direction of a signal to be sent and the z-axis in the spatial rectangular coordinate system; $\theta$ represents an angle between a projection of the transmission direction of the signal to be sent on the xoy plane and an x-axis in the spatial rectangular coordinate system; $\lambda$ represents a wavelength of the signal to be sent; $d_x$ represents a distance between two adjacent antennas in the uniform rectangular antenna array in a direction of the x-axis;

and $d_y$ represents a distance between two adjacent antennas in the uniform rectangular antenna array in a direction of a y-axis;

assuming that an omnidirectional beamforming matrix set formed by performing beamforming on the uniform rectangular antenna array is $\{W_n\}_{n=1}^N$; wherein $W_n \in \mathbb{C}^{L \times M}$; an autocorrelation of the $\{W_n\}_{n=1}^N$ is calculated as follows:

$$R_{W_n}(\varsigma, \tau) = \sum_{l=1}^{L} \sum_{m=1}^{M} W_n(l, m) W_n^*(l+\varsigma, m+\tau), -L+1 \leq \varsigma \leq L-1,$$
$$-M+1 \leq \tau \leq M-1;$$

wherein ς represents a translation in the direction of they-axis; τ represents a translation in the direction of the x-axis; and (•)* represents a conjugation;

the omnidirectional beamforming matrix set $\{W_n\}_{n=1}^N$ satisfies the following equation:

$\Sigma_{n=1}^N R_{W_n}(\varsigma,\tau) = LMN \cdot \delta(\varsigma)\delta(\tau);$ wherein the omnidirectional beamforming matrix set $\{W_n\}_{n=1}^N$ is autocorrelation complementary matrices (L,M,N)-ACM; δ(ς) and δ(τ) are both a Kronecker delta functions $$\delta(\varsigma) = \begin{cases} 1 & \varsigma = 0 \\ 0 & \varsigma \neq 0 \end{cases};$$

when N=2, (L,M,N)-ACM is a pair of Golay complementary matrices; and performing beamforming on the coded data stream through the omnidirectional beamforming matrices, to generate the signal to be sent of the uniform rectangular antenna array;

wherein the omnidirectional beamforming matrices are shown as follows:

$W_1 = (ca^T, db^T), W_2 = (-\tilde{d}a^T, \tilde{c}b^T) \in \mathbb{C}^{L \times M};$ wherein the number of the rows L and half of the number of the columns M/2 of the uniform rectangular antenna array are both complex Golay numbers; $W_1$ and $W_2$ are a pair of Golay complementary matrices; a sequence a and a sequence b are a pair of Golay complementary sequences with a length of M/2; a sequence c and a sequence d are a pair of Golay complementary sequences with a length of L; and (˜•) represents conjugation and flip.

* * * * *